US012491480B2

(12) United States Patent
Deslandes et al.

(10) Patent No.: US 12,491,480 B2
(45) Date of Patent: Dec. 9, 2025

(54) PRESSURIZED GAS SUPPLY AND GAS CYLINDER

(71) Applicant: Coravin, Inc., Bedford, MA (US)

(72) Inventors: Sarah Deslandes, Rio Vista, CA (US); Michael Rider, Lowell, MA (US)

(73) Assignee: Coravin, Inc., Bedford, MA (US)

( * ) Notice: Subject to any disclaimer, the term of this patent is extended or adjusted under 35 U.S.C. 154(b) by 515 days.

(21) Appl. No.: 17/959,660

(22) Filed: Oct. 4, 2022

(65) Prior Publication Data

US 2023/0109966 A1 Apr. 13, 2023

Related U.S. Application Data

(60) Provisional application No. 63/253,833, filed on Oct. 8, 2021.

(51) Int. Cl.
*B01F 23/23* (2022.01)
*B01F 23/2361* (2022.01)
(Continued)

(52) U.S. Cl.
CPC .......... *B01F 23/23611* (2022.01); *F17C 1/00* (2013.01); *B01F 2101/16* (2022.01); *F17C 2250/043* (2013.01); *F17C 2270/0736* (2013.01)

(58) Field of Classification Search
CPC .. B01F 23/23611; B01F 2101/16; F17C 1/00; F17C 2250/043; F17C 2270/0736;
(Continued)

(56) References Cited

U.S. PATENT DOCUMENTS

| | | | | |
|---|---|---|---|---|
| 718,163 A | | 1/1903 | Sherrard | |
| 1,509,916 A | * | 9/1924 | Waite .................... | B65B 31/027 215/DIG. 3 |

(Continued)

FOREIGN PATENT DOCUMENTS

| | | |
|---|---|---|
| EP | 0 026 077 A1 | 4/1981 |
| EP | 0 258 057 A2 | 3/1988 |

(Continued)

OTHER PUBLICATIONS

Invitation to Pay Additional Fees and Communication Relating to the Results of the Partial International Search for International Application No. PCT/US2022/046035, mailed Feb. 3, 2023.

(Continued)

*Primary Examiner* — Stephen Hobson
(74) *Attorney, Agent, or Firm* — Wolf, Greenfield & Sacks, P.C.

(57) ABSTRACT

A gas source for pressuring sparkling and other beverage containers, e.g., to re-pressurize the container to keep a carbonation level of beverage during storage. A gas cylinder can include a cap with a flange and catch below the flange. The catch can be engaged by a cylinder support to move the cylinder into contact with a piercing element to pierce the gas outlet of the cylinder and form a seal between the cylinder and gas receiver. A pressure indicator can have a single pressure sensor to indicate a capacity of a gas cylinder to deliver pressurized gas and a pressure in a beverage container.

15 Claims, 6 Drawing Sheets

(51) Int. Cl.
*F17C 1/00* (2006.01)
*B01F 101/16* (2022.01)

(58) Field of Classification Search
CPC ........ F17C 2201/0109; F17C 2201/058; F17C 2203/0617; F17C 2205/0111; F17C 2205/032; F17C 2221/013; F17C 2221/014; F17C 2221/016; F17C 2223/0123; F17C 2223/036; F17C 2265/037; F17C 2270/0105; B67D 1/0418; C12G 3/08; C12G 1/06
See application file for complete search history.

(56) References Cited

U.S. PATENT DOCUMENTS 2,072,629 A * 3/1937 Fernholz ........... B01F 23/23611 141/285
2,367,077 A * 1/1945 Ward ................... B67D 1/0418 222/400.7
2,496,258 A * 2/1950 Alexander ........... B65D 51/002 222/82
2,705,578 A * 4/1955 Burns ................ G05D 16/0655 141/19
3,191,533 A * 6/1965 Hopson, III ............ F16K 13/06 137/68.13
3,200,994 A * 8/1965 Levinson ............. B67D 1/0412 222/542
3,272,404 A * 9/1966 Graves ................. B67D 1/0418 137/212
3,327,899 A * 6/1967 Reynolds ............. B67D 1/1256 222/400.7
3,542,240 A * 11/1970 Solowey ............... A61M 5/162 222/479
3,817,302 A * 6/1974 Kowal .................. F17C 13/123 141/383
3,883,043 A * 5/1975 Lane .................... B67D 1/0412 222/399
3,976,221 A * 8/1976 Martin ................. B67D 1/0418 138/40
4,011,971 A * 3/1977 Haydon ............... B67D 1/0412 222/399
4,143,678 A * 3/1979 Sugimura ................. F15B 1/08 220/721
4,304,741 A * 12/1981 Avison ................. B67D 1/0412 261/DIG. 7
4,473,174 A * 9/1984 Heuser ................. B67D 1/0885 215/311
4,475,576 A * 10/1984 Simon ...................... C12H 1/16 215/311
4,595,121 A * 6/1986 Schultz ................ B67D 1/0885 116/DIG. 8
4,674,662 A * 6/1987 Bergstrom ........... B67D 1/0412 222/399
4,691,482 A * 9/1987 Heinemann ........... E04D 3/3608 52/95
4,694,850 A * 9/1987 Fumino ................. A61M 16/10 222/82
4,706,847 A * 11/1987 Sankey .................... B67D 1/04 285/308
4,763,803 A * 8/1988 Schneider ............. B65B 31/047 215/311
4,770,323 A * 9/1988 Debard ................ B65D 83/382 222/89
4,787,429 A * 11/1988 Valentini ............... A61M 39/14 141/382
4,856,680 A * 8/1989 Sitton .................. B67D 1/0885 222/130
4,867,209 A * 9/1989 Santoiemmo ..... B01F 23/23611 261/DIG. 7
4,932,561 A * 6/1990 Boxall ................. B67D 1/0858 222/638
4,953,741 A * 9/1990 Jessop ................... B01L 3/5021 422/918
4,976,984 A * 12/1990 Yasukawa ................. A23J 7/00 426/33
4,982,879 A * 1/1991 Corrado ............... B67D 1/0412 222/402.1
4,984,711 A * 1/1991 Ellis .......................... B67B 7/26 222/400.7
5,020,395 A * 6/1991 Mackey .................... B67B 7/08 81/3.2
5,031,799 A * 7/1991 Owen ................ B01F 33/5014 261/DIG. 7
5,056,676 A * 10/1991 Allen ..................... B65D 45/24 215/280
5,139,179 A * 8/1992 Cecil .................... B67D 1/0885 222/400.7
5,163,909 A * 11/1992 Stewart ............... A61M 39/223 604/131
5,180,081 A * 1/1993 McCann .............. B67D 1/0418 222/400.7
5,395,012 A * 3/1995 Grill ....................... B65B 31/08 222/399
5,407,096 A * 4/1995 Smith ..................... F17C 13/04 222/3
5,413,230 A * 5/1995 Folter ....................... A23L 2/54 251/339
5,413,247 A * 5/1995 Glasa ........................ B63C 9/18 222/83.5
5,590,696 A * 1/1997 Phillips ..................... F17C 7/00 222/3
5,803,288 A * 9/1998 Munini .................. B65D 45/02 215/275
5,947,172 A * 9/1999 Glotin ....................... B60S 5/04 141/38
6,213,323 B1 * 4/2001 Ferrari ................... B65D 45/22 215/277
6,371,173 B1 * 4/2002 Liebmann, Jr. ....... F17C 13/002 141/19
6,607,100 B2 * 8/2003 Phelps ................ B67D 1/0858 222/399
6,789,698 B2 * 9/2004 Gloor ..................... B67D 1/008 222/542
6,843,388 B1 * 1/2005 Hollars ................... F17C 13/06 222/5
7,056,179 B2 * 6/2006 Courtney ............. B63C 9/1255 441/90
7,703,640 B1 * 4/2010 Hollars ................. F16K 17/383 169/72
7,712,637 B2 * 5/2010 Lambrecht ........... B67D 1/0885 141/330
7,837,132 B2 * 11/2010 Mazooji ................ B05B 9/0861 239/263.1
8,033,431 B2 * 10/2011 Sommerfield ....... B67D 1/1455 222/394
8,162,914 B2 * 4/2012 Kraushaar ............. A61J 1/2096 604/414
8,225,959 B2 7/2012 Lambrecht
8,523,838 B2 * 9/2013 Tornqvist ................ F16K 17/19 604/416
8,562,583 B2 * 10/2013 Akerlund .............. A61J 1/2096 604/416
9,016,502 B2 * 4/2015 Hollars ................... F17C 13/06 220/267
9,248,416 B2 * 2/2016 Striebinger ....... B01F 23/23611
9,351,905 B2 * 5/2016 Fangrow ............... A61J 1/2062
9,610,217 B2 * 4/2017 Fangrow ............... A61J 1/2096
10,160,560 B2 * 12/2018 Schovain ............... A23B 70/10
10,398,834 B2 * 9/2019 Tornqvist .................. A61J 1/20
11,744,775 B2 * 9/2023 Chhikara .............. A61J 1/2075 604/411
2008/0017179 A1 * 1/2008 Vasel ........................ F17C 7/00 124/56
2009/0302038 A1 * 12/2009 Taggart ................ B67D 1/0869 215/44
2010/0140265 A1 * 6/2010 Oberhofer .............. B67D 1/125 220/203.01

(56) References Cited

U.S. PATENT DOCUMENTS

| | | | | |
|---|---|---|---|---|
| 2010/0206390 | A1* | 8/2010 | Hollars | F16K 17/403 222/5 |
| 2011/0016692 | A1* | 1/2011 | Hollars | F17C 13/06 29/428 |
| 2012/0073674 | A1* | 3/2012 | Tatarek | F17C 13/06 137/68.11 |
| 2013/0037969 | A1* | 2/2013 | Ring | B65D 45/322 141/69 |
| 2014/0042703 | A1* | 2/2014 | Tarapata | B65D 41/0428 29/432.1 |
| 2014/0097184 | A1* | 4/2014 | Hollars | F17C 13/06 220/259.3 |
| 2014/0360971 | A1* | 12/2014 | Marino | B65D 81/2038 215/260 |
| 2014/0361036 | A1* | 12/2014 | Brouillette | A61M 5/2053 222/5 |
| 2015/0201794 | A1* | 7/2015 | Hoffmann | A23L 2/54 261/30 |
| 2016/0084442 | A1* | 3/2016 | Holbeche | F17C 1/00 222/5 |
| 2016/0348847 | A1* | 12/2016 | Wilder | B65D 71/0055 |
| 2017/0029081 | A1* | 2/2017 | Michalski | F17C 1/00 |
| 2017/0113915 | A1* | 4/2017 | Wolthers | B65D 83/673 |
| 2017/0137275 | A1* | 5/2017 | Lambrecht | B67D 1/0082 |
| 2018/0106431 | A1* | 4/2018 | Timm | F17C 13/04 |
| 2018/0257841 | A1* | 9/2018 | Jüni | B65B 31/047 |
| 2019/0031486 | A1* | 1/2019 | DeRuntz | B67D 1/0885 |
| 2019/0039785 | A1* | 2/2019 | Gormley | B65D 81/2076 |
| 2019/0202680 | A1* | 7/2019 | Rider | B67D 1/0888 |
| 2019/0219227 | A1* | 7/2019 | Frenal | F17C 13/04 |
| 2020/0018407 | A1* | 1/2020 | Molfa | F16K 17/403 |
| 2021/0140588 | A1* | 5/2021 | Sawai | F17C 13/06 |
| 2021/0206616 | A1* | 7/2021 | Hartsfield | B67D 1/0006 |
| 2021/0276748 | A1* | 9/2021 | Deslandes | B01F 23/23611 |
| 2021/0276771 | A1* | 9/2021 | DeRuntz | B01F 23/2361 |
| 2022/0205593 | A1* | 6/2022 | White | F17C 13/06 |
| 2024/0316509 | A1* | 9/2024 | Stalder | B01F 23/237621 |

FOREIGN PATENT DOCUMENTS

| | | | | | |
|---|---|---|---|---|---|
| EP | 3130833 | A1 | * | 2/2017 | F17C 1/00 |
| EP | 3141791 | A1 | * | 3/2017 | F17C 13/06 |
| EP | 3276246 | A1 | * | 1/2018 | F17C 13/06 |
| EP | 3282169 | A1 | * | 2/2018 | F17C 13/06 |
| FR | 2257855 | A1 | | 8/1975 | |
| FR | 2507735 | A1 | | 12/1982 | |
| GB | 191008433 | A | | 10/1910 | |
| GB | 2552988 | A | * | 2/2018 | F17C 13/06 |
| WO | WO 2007/145641 | A1 | | 12/2007 | |
| WO | WO 2013/162373 | A1 | | 10/2013 | |
| WO | WO 2014/037425 | A1 | | 3/2014 | |
| WO | WO 2014/144873 | A1 | | 9/2014 | |
| WO | WO 2018/195225 | A1 | | 10/2018 | |

OTHER PUBLICATIONS

PCT/US2022/046035, Feb. 3, 2023, Invitation to Pay Additional Fees and Communication Relating to the Results of the Partial International Search.

International Search Report and Written Opinion for International Application No. PCT/US2022/046035, mailed Mar. 24, 2023.

Invitation to Pay Additional Fees for International Application No. PCT/US2021/021041, mailed Jun. 28, 2021.

International Search Report and Written Opinion for International Application No. PCT/US2021/021041, mailed Aug. 18, 2021.

International Preliminary Report on Patentability for International Application No. PCT/US2021/021041, mailed Sep. 15, 2022.

International Search Report and Written Opinion for International Application No. PCT/US2013/063814, mailed Apr. 9, 2014.

* cited by examiner

PRESSURIZED GAS SUPPLY AND GAS CYLINDER

RELATED APPLICATION

This application claims priority under 35 U.S.C. § 119(e) to U.S. Provisional Application No. 63/253,833, filed Oct. 8, 2021, which is herein incorporated by reference in its entirety.

BACKGROUND OF INVENTION

This invention relates generally to dispensing pressurized gas, e.g., for re-pressurizing a bottle of sparkling wine after pouring wine from the bottle.

SUMMARY OF INVENTION

One or more embodiments allow a user to dispense a beverage, such as wine, from a bottle or other container. In some cases, dispensing of liquid from such a bottle may be performed one or more times, and a stopper may be engaged with the bottle after each beverage dispensing to seal closed the interior of the bottle. Thus, the beverage may be dispensed from the bottle multiple times and stored for extended periods between each dispensing while minimizing effect on beverage quality. In some embodiments, little or no gas, such as air, which is reactive with the beverage, may be introduced into or remain in the bottle after dispensing of beverage from within the bottle. Thus, in some embodiments, a user may dispense wine from a wine bottle and subsequently purge air from the bottle and seal the bottle from air or other potentially damaging gasses or liquids entering into the bottle. In some embodiments, a pressure above ambient pressure may be introduced into and maintained in the bottle after dispensing is complete, which may help maintain a carbonation level in a sparkling beverage, and such pressure may be established by introducing pressurized gas through the stopper.

In some embodiments, a pressurized gas source for use in providing pressurized gas into a beverage container or other receptacle includes a housing configured to support a gas cylinder. The housing may be arranged to be held by hand, e.g., having a handle that can be gripped or provide aid in gripping by a user. A gas outlet may be mounted to the housing, e.g., at a bottom end of the housing, and arranged to provide the pressurized gas for delivery to the beverage container or other receptacle. For example, the gas outlet may be arranged with a valve so that pressing the housing downwardly onto a gas port of a gas receiving device (such as a stopper on a beverage container) moves a portion of the valve upwardly and opens the valve to deliver gas. Removing downward force on the housing may cause the valve to close and stop gas delivery. A regulator may be supported by the housing and arranged to receive gas at a first pressure from the gas cylinder and to provide gas at a second pressure lower than the first pressure to the gas outlet. The regulator may be arranged in a variety of ways, such as having one or more pressure regulation stages, an adjustable output pressure, etc. A piercing lance may be arranged to pierce an outlet of the gas cylinder to release the pressurized gas for delivery to the regulator. The piercing lance and gas cylinder may be movable relative to each other to pierce the gas outlet of the gas cylinder. In some embodiments, a cylinder holder can engage with a portion of a cap on the gas cylinder to force the gas cylinder into engagement with the piercing lance. Alternately, a cylinder holder can engage with a portion of the cap to support the gas cylinder during movement of the piercing lance into engagement with the gas outlet for piercing. Thus, the gas cylinder can be supported at a cap and held stationary relative to the gas source housing during movement of the piercing lance to pierce the outlet of the gas cylinder, or moved relative to the gas source housing for piercing. This arrangement may allow the gas source to accommodate a wide variety of differently sized and/or shaped gas cylinders because the cylinders need only be engaged at a cap portion of the cylinders to allow for effective and repeatable piercing.

In some aspects, a gas cylinder includes a body having a storage volume and a neck having a top surface with a piercable gas outlet. The gas cylinder can hold pressurized gas and/or liquid, such as argon, carbon dioxide, nitrogen or other compounds or mixtures of compounds whether in liquid and/or gas form. A cap can be secured to the neck and have a sidewall extending around the top surface and a portion of the neck of the gas cylinder body. The sidewall can define an inner space and an upper opening to the inner space, and can include a flange that extends radially outwardly from the sidewall and that has a lower surface positioned above a lower portion of the sidewall. The lower surface of the flange and the lower portion of the sidewall can form a catch for an engagement pawl, e.g., that is used to engage with the gas cylinder and force the gas cylinder into engagement with a gas receiver to deliver pressurized gas to the gas receiver. A gasket can be located in the inner space and configured to form a seal with the top surface and to form a seal with a piercing element that extends into the inner space to pierce the gas outlet. For example, when the gas cylinder is forced into engagement with a gas receiver, a piercing lance of the receiver can extend into the inner space through the upper opening of the cap to both form a seal with the gasket and pierce the gas outlet of the cylinder. Thus, the cap can be configured to support the gas cylinder to pierce the gas outlet in response to the engagement pawl engaging with the catch and forcing the cap and body into engagement with a piercing element received into the upper opening.

In some embodiments, the flange and the cap are made as single unitary piece, whereas in some embodiments the flange and cap are made separately and then attached together whether before or during attachment to the gas cylinder body.

In some embodiments, the sidewall of the cap can be arranged to extend above the top surface of the neck, e.g., so the upper opening is positioned above the gas outlet. The gasket can have an upper surface with a region of the upper surface exposed at the upper opening of the cap and arranged to contact the piercing element received in the upper opening of the cap to pierce the gas outlet of the cylinder. The gasket can also have a lower surface arranged to form the seal with the top surface of the neck, e.g., in response to the piercing element pushing the gasket into contact with the top surface of the cylinder body. In some cases, the cap includes an upper wall having an annular shape that extends radially inwardly from the sidewall and includes a radially inner part that defines the upper opening. The upper wall can, for example, help retain the gasket in the inner space. In some embodiments, the gasket has an uppermost part of an upper surface located radially inward of the radially inner part of the upper wall, and in some cases the uppermost part of the upper surface of the gasket can extend into the upper opening, e.g., to aid in forming a seal with a piercing element before the piercing element pierces the gas outlet.

In some embodiments, the cap includes an internal thread arranged to engage with an external thread on the neck. In some cases, the cap can be secured to the neck by an adhesive, welding or other attachment whether in addition to or in place of a threaded engagement.

In some embodiments, the catch has a curved shape at a junction between the lower surface of the flange and the lower portion of the sidewall, e.g., the curved shape can extend around the cap. The curved shape can help ensure that an engagement pawl engages with the cap at a suitable location to help center or otherwise position the cap for proper engagement with a gas receiver.

In some embodiments, the gas cylinder can be combined with a cylinder holder that has a space in which to receive the body of the gas cylinder. The cylinder holder can have one or more engagement pawls configured at an opening to the space to engage with the catch of the gas cylinder received in the space. For example, the gas cylinder can be received into the cylinder holder by inserting a bottom end of the cylinder opposite the cap into the cylinder holder. The cylinder can be received into the holder until the one or more engagement pawls engage with the cap at the catch below the flange. With the engagement pawl(s) engaged with the cap, the gas cylinder can be suspended or otherwise held relative to the cylinder holder by the pawl(s). In some cases, the one or more engagement pawls can be arranged to engage with the gas cylinder so as to force the cap, gasket and gas outlet into engagement with a piercing element of a gas receiver of a gas supply to pierce the gas outlet. In some cases, the cylinder holder includes a threaded portion configured to engage with the gas supply to move the gas outlet into engagement with the piercing element in response to rotation of the cylinder holder relative to the gas supply. In some embodiments, the one or more engagement pawls are pivotally mounted to move into and out of a pathway along which the gas cylinder is received into the space. For example, the gas cylinder body and the one or more engagement pawls can be configured such that movement of the gas cylinder body into the space pivots the one or more engagement pawls out of the pathway. This movement can permit the gas cylinder to be received into the space. In some cases, the one or more engagement pawls can resiliently biased to move into the pathway, e.g., the cylinder body can move the pawl(s) against the resilient bias to permit the cylinder body to be received into the space of the cylinder holder. With the body at least partly received into the space, the pawl(s) can be biased to a position to engage with the catch of the cap. In some embodiments, the cylinder holder, cap and body can be configured such that the body is suspended in the space of the cylinder holder when the one or more engagement pawls are engaged with the catch of the cap. In some cases, the one or more engagement pawls each have an engagement end that engages with the catch opposite a mounted end at which the engagement pawl is mounted to the cylinder holder, e.g., the engagement end can be positioned nearer the opening to the space than the mounted end, which can be pivotally attached to cylinder holder.

In some aspects, a pressurized gas source for use in providing pressurized gas into a beverage container can include a housing with a support for a gas cylinder holding the pressurized gas, a gas outlet (e.g., having an outlet valve) mounted to the housing and arranged to provide the pressurized gas for delivery to the beverage container, and a regulator supported by the housing and arranged to receive gas at a first pressure from the gas cylinder and to provide gas at a second pressure lower than the first pressure to the gas outlet. A conduit can be coupled between the regulator and the gas outlet to deliver the gas from the regulator to the gas outlet, and a pressure indicator can be configured to both indicate whether a pressure in the beverage container is over a threshold when the gas outlet is coupled to the beverage container and the outlet valve is open, and to indicate whether the gas cylinder has capacity to deliver pressurized gas to a beverage container when the outlet valve is closed. Thus, the pressure indicator can perform two functions regarding the ability of the gas source to deliver pressurized gas to a container and indicate a gas pressure in the container after or while gas is delivered to the container.

In some embodiments, the pressure indicator is configured to indicate whether the gas cylinder has capacity to pressurize a beverage container when the outlet valve is closed and the gas outlet is uncoupled to the beverage container. In some cases, the outlet valve is normally closed and is opened by moving the gas outlet into engagement with a stopper on the beverage container.

In some cases, the pressure indicator includes a single pressure sensor element and a single indicator element to indicate both whether the pressure in the container is over a threshold and whether the gas cylinder has capacity to pressurize the beverage container. For example, the single pressure sensor element can include a resiliently biased piston that is movable based on a pressure in the conduit, and the single indicator element can be coupled to the piston to move and provide an indication based on a position of the piston. In some cases, the indicator element is movable between positions in which a first portion of the indicator element is visible for pressures below the threshold and a second portion of the indicator element is visible for pressures above the threshold. In some embodiments, the first and second portions of the indicator element are visible through a window of the housing.

In some embodiments, the regulator includes a piercing lance arranged to pierce an outlet of the gas cylinder to release the pressurized gas. In some cases, the gas supply includes a gas cylinder support configured to move the gas cylinder relative to the housing to pierce an outlet of the gas cylinder. For example, a gas cylinder support can be configured to engage with the flange arranged at the neck of a gas cylinder to move the gas cylinder relative to the housing to pierce the outlet of the gas cylinder.

In one embodiment, a stopper is provided for use with a beverage container having a neck, an opening at the neck to access an internal volume of the container, and a lip on an outer surface of the neck. The stopper may include a stopper body having a sealing surface arranged to contact and form a seal with a portion of the neck around the opening, e.g., to seal the interior space of the bottle from gasses or other external environmental conditions. The stopper may include a gas inlet port arranged to receive pressurized gas from the gas outlet of the gas source and deliver the pressurized gas into the interior space of the container. The stopper may be arranged to seal the opening of the container to hold or otherwise suitably maintain a pressure above ambient in the container, e.g., to help keep a carbonation level of the beverage at a suitable level. For example, the stopper may include a gas pathway that extends from a gas inlet port to a gas outlet. The gas pathway may extend from a top of the stopper body where the gas inlet port is located to a location adjacent the sealing surface where the gas outlet is located to introduce pressurized gas into the container. A check valve or other one-way valve may be provided in the gas pathway to prevent flow from the gas outlet to the inlet. A vent and/or pressure indicator may be provided with the stopper as well, e.g., to vent pressure over a threshold level to allow purging of air from a bottle and indicate a pressure in the bottle.

Various exemplary embodiments of the device are further depicted and described below.

BRIEF DESCRIPTION OF THE DRAWINGS

Aspects of the invention are described with reference to various embodiments, and to the figures, which include.

DETAILED DESCRIPTION

Inventive features are described below with reference to illustrative embodiments, but it should be understood that inventive features are not to be construed narrowly in view of the specific embodiments described. Thus, aspects of the invention are not limited to the embodiments described herein. It should also be understood that various inventive features may be used alone and/or in any suitable combination with each other, and thus various embodiments should not be interpreted as requiring any particular combination or combinations of features. Instead, one or more features of the embodiments described may be combined with any other suitable features of other embodiments. For example, one embodiment of a gas supply employs a gas cylinder that is supported at a portion of a cap on the gas cylinder, as well as a pressure indicator configured to indicate both a capacity of the gas cylinder to provide pressurized gas to a beverage container and a pressure in a beverage container. These features may be used together as in the embodiments below, or independently of each other, e.g., the gas cylinder cap feature may be used in a gas supply that has no pressure indicator, a gas supply including a pressure indicator as described can be configured to operate with gas cylinders having no cap or other support arrangement, etc.

Figure 1:
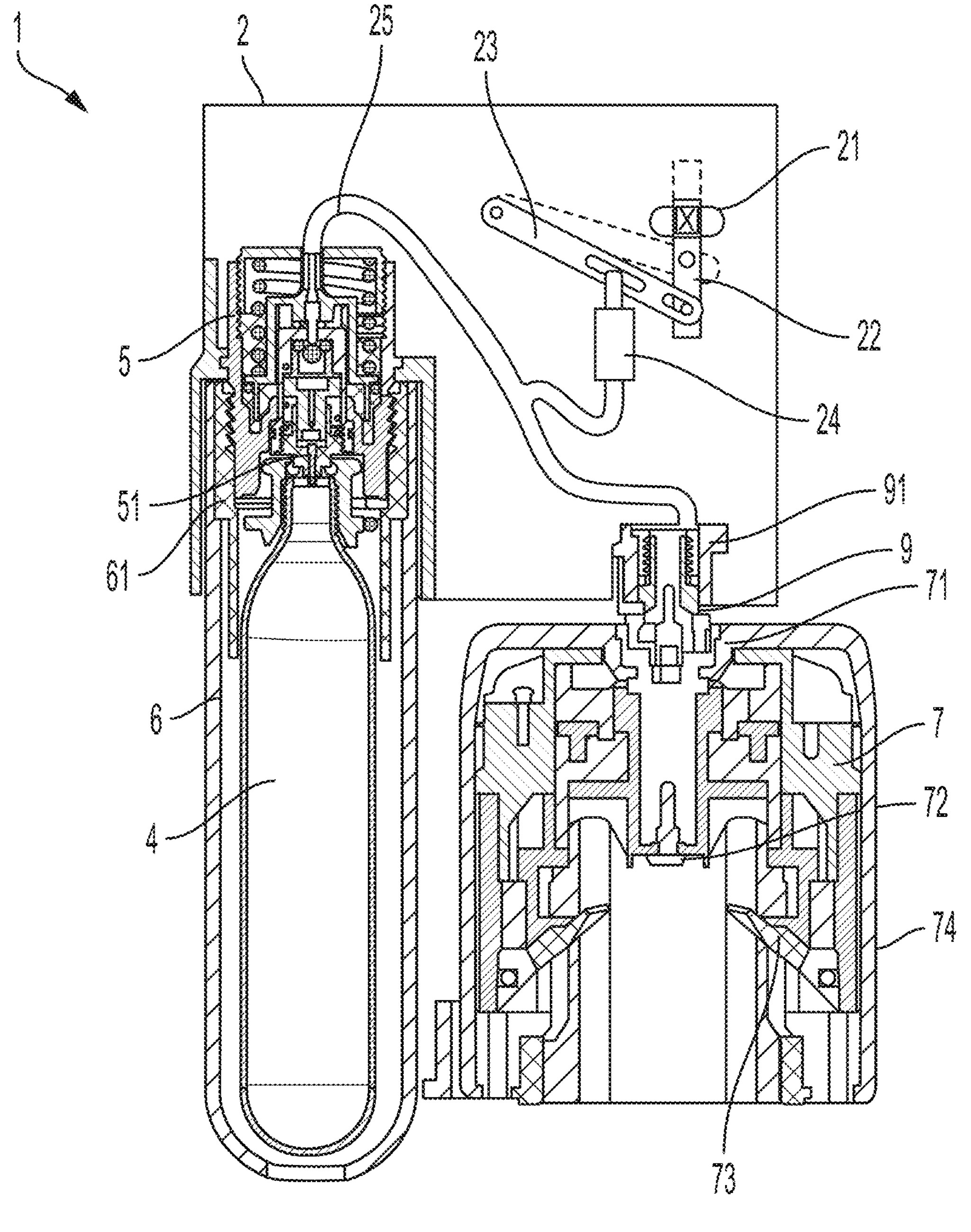
FIG. 1 shows a sectional view of a gas source and beverage container stopper in an illustrative embodiment.

FIG. 1 shows a perspective view of a gas source 1 that may be used for various applications, such as inflating tires, pressurizing or re-pressurizing sparkling wine and other carbonated beverage bottles after dispensing, purging air from a pressurized beverage container that stores beverage at low or no pressure, charging accumulators, etc. In the description below, use in pressurizing carbonated beverage containers is specifically referenced but inventive aspects should not be limited to this application. The gas source 1 has a housing 2 that supports various components of the gas source 1, and in this embodiment has a rectangular box-like shape, although other shapes and configurations are possible. For example, the housing 2 could include an opening that defines a handle through which a user may extend fingers to grip the main body of the housing 2 with fingers and thumb. In some embodiments, the gas source 1 includes a gas cylinder holder 6 that is removably attached to the housing 1 and has a portion that extends below a bottom wall of the housing 1. The cylinder holder 6 can be configured to provide a handle or other gripping area for a user so the user can manipulate and operate the gas source 1 while holding the cylinder holder 6. For example, in some embodiments the gas source 1 has a gas outlet 9 located at the bottom wall of the housing 2. This positioning for the gas outlet 9 may allow a user to place the gas source 1 over a gas receiving port (such as an inflation valve or a tire or gas inlet port 71 of a beverage container stopper 7 as shown in FIG. 1) and press the gas source 1 downwardly over the receiving port to deliver gas. In some embodiments, the gas outlet 9 is arranged with an outlet valve 91 that is normally closed, and opens to permit gas flow when the gas outlet 9 is pressed downwardly on a receiving port (which moves a portion of the gas outlet valve 91 to open the valve). Releasing the gas source 1 from the receiving port will close the gas outlet valve 91, stopping gas flow. However, in some embodiments, gas may be released by a user operating a lever or button, squeezing a handle, or in other ways.

Figure 2:
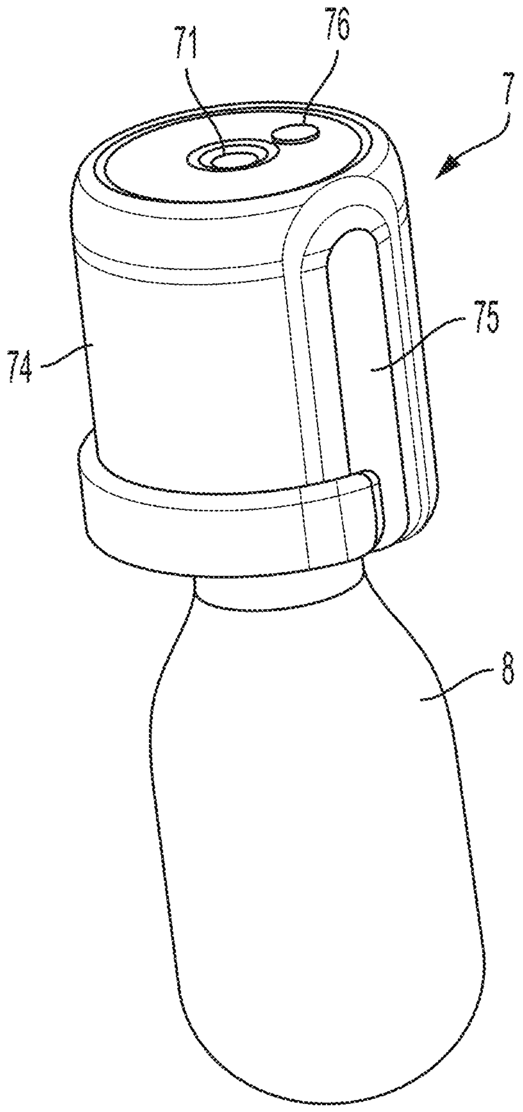
FIG. 2 shows a perspective view of a beverage container and stopper shown in FIG. 1.
Figure 3:
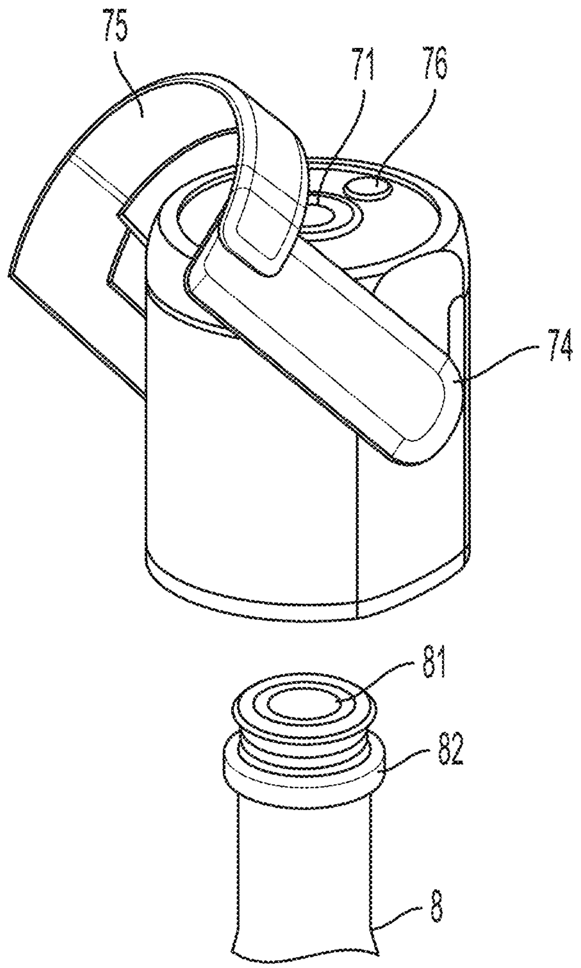
FIG. 3 shows the stopper of FIG. 2 disengaged from the beverage container.

In some embodiments, the gas source 1 can be configured to deliver gas into a beverage container so that the interior space of the container can be pressurized to a desired level for storing beverage in the container. Different arrangements can be used to seal a container closed and receive pressurized gas from the gas source 1 to pressurize the container. The stopper 7 shown in FIG. 1 is one such device and is configured to engage with a beverage container to seal the container closed, e.g., to maintain an above ambient pressure in the container for an extended period of days, weeks or more. FIGS. 2 and 3 show the stopper 7 of FIG. 1 both engaged with and disengaged from a container 8, respectively. A lever 75 or other user-manipulable element can be operated to cause a sealing surface and one or more pawls 73 to engage with the container to establish and maintain a seal at the container opening and/or disengage the stopper 7 from the container 8. For example, the lever 75 can be moved to an open position as shown in FIG. 3 which moves the pawls 73 to a disengaged position, allowing the stopper 7 to be removed from the container 8 and/or the container neck to be received into a cavity of the stopper 7 where the pawls 73 are located. With the container neck received into the cavity of the stopper 7, the lever 75 can be operated to cause the pawls 73 to engage with a lip 82 of the container neck and force the sealing surface of the stopper 7 into engagement with the opening 81 of the container so as to form a seal with the opening 81 and seal the interior space of the container 8 closed. Thereafter, gas can be provided to the gas inlet 71 of the stopper 7, e.g., to pressurize and/or purge gas from the beverage container 8. Pressurized gas provided to the gas inlet 71 of the stopper 7 can be directed through a check valve 72 or other arrangement of the stopper 7 and into the beverage container. The gas inlet 71 can be located at a top wall of the stopper 7 housing 74 or other locations such as at the stopper 7 sidewall. In addition or alternately to a check valve or other arrangement to prevent gas from escaping from the container, the stopper 7 can include a vent valve or other feature to allow gas to be purged from the container interior space and/or suitably pressurize the container. For example, a vent valve may permit pressurized gas to be introduced into the container and establish pressure in the container up to a threshold after which the vent valve opens to release pressure over the threshold. A pressure indicator 76 can indicate whether the container interior space is suitably pressurized, e.g., prompting a user to stop gas introduction into the container.

To provide pressurized gas, the gas source 1 includes a gas cylinder 4 that holds pressurized gas in a storage volume, e.g., carbon dioxide (CO2), argon, nitrogen, or other gas at relatively high pressures of 200-5000 psi. The gas cylinder 4 is held by the cylinder holder 6 which operates to hold the gas cylinder 4 in engagement with a piercing lance 51 to pierce a gas outlet of the cylinder 4 and release the pressurized gas from the gas cylinder 4 to a gas pathway or other gas receiver of the gas source 1. The pressurized gas can be received by a regulator 5 which is configured to receive high pressure gas from the cylinder 4 and reduce its pressure for delivery to the gas outlet 9, e.g., via a tube or other conduit 25. For example, a gas cylinder 4 holding carbon dioxide may have an internal pressure of 500 to 1000 psi, and the regulator 5 may reduce this pressure to something suitable for the intended application, such as 15 to 50 psi for re-pressurizing a sparkling beverage container. In some cases, the regulator 5 may be adjustable by a user or technician to provide different gas pressures at the gas outlet 9. For example, the regulator 5 may include a dial, adjustable screw, or other feature used to adjust the output gas pressure. In some embodiments, the regulator 5 and piercing lance 51 can be fixed together and moved relative to the housing 2 and the gas cylinder 4 to pierce the gas cylinder outlet. Alternately, the regulator 5 and piercing lance 51 can be fixed relative to the housing 2 and the gas cylinder 4 can be moved by the cylinder holder 6 relative to the piercing lance 51 to pierce the gas outlet of the cylinder 4. Although a regulator 5 is included in some embodiments, a regulator is not required. Instead, a flow restrictor or other element may operate to reduce a delivery pressure of gas at the gas outlet 9, at least when gas is flowing above a threshold rate.

In some embodiments, the gas source 1 can include a pressure indicator configured to indicate whether a pressure in a beverage container (or other device receiving pressurized gas from the gas source 1) is over a threshold when the gas outlet 9 is coupled to the beverage container and the outlet valve 91 is open, and to indicate whether the gas cylinder 4 has capacity to pressurize a beverage container when the outlet valve 91 is closed. Thus, a single pressure indicator can provide two functions, i.e., indicate a pressure in a beverage container or other device receiving pressurized gas from the gas source 1 as well as indicate whether a gas cylinder has suitable capacity to provide pressurized gas to a beverage container or other destination device. This can simplify operation of the gas source 1 by a user, e.g., because the user need only monitor a single pressure indicator to determine whether a beverage container is suitably pressurized as well as whether a gas cylinder can provide pressurized gas. That is, while the pressure indicator cannot necessarily indicate the pressure in a container and a capacity of a gas cylinder to provide pressurized gas at the same time, the single pressure indicator can provide both indications at separate times, such as based on whether the gas outlet valve 91 is open or closed.

In some embodiments, the pressure indicator can include a single pressure sensor element and a single indicator element to indicate both the pressure in a beverage container and whether the gas cylinder has capacity to deliver pressurized gas. For example, FIG. 1 shows a single pressure sensor element 24 that is fluidly coupled to the conduit 25 via which pressurized gas is provided to the gas outlet 9. The pressure sensor element 24 includes a movable element that moves to different positions in response to pressure in the conduit 25. The movable element is coupled to a lever arm 23 which is pivotally mounted relative to the housing 2 at one end, e.g., on the left in FIG. 1. An opposite end of the lever arm 23 is coupled to an indicator element 22 so that as the movable element of the pressure sensor element 24 moves, the indicator element 22 moves upwardly and downwardly relative to an indicator window 21 of the housing 2. The indicator window 21 is arranged so that a relatively small portion of the indicator element 22 is visible through the indicator window 21. As a result, the portion of the indicator element 22 that is visible through the indicator window 21 will indicate a relative pressure in the conduit 25. In some embodiments, the indicator element 22 includes two marked portions, e.g., a first portion with an "X" and a second portion with an "O". The X is intended to indicate relatively low or no pressure and the O is intended to indicate relatively high pressure or pressure over a threshold. Of course, other indicia can be used, such as red and green markings or other colors, numbers (e.g., "0" and "1"), text (e.g., "full" and "empty") and so on. Also, the indicator element can be configured to provide more than two indications, e.g., three or more indications representative of a pressure in the conduit 25, e.g., "0", "½", "¾" and "Full" or other indications to provide three or more pressure level indications. While the indicator window 21 in some embodiments is arranged at a side of the housing 1, the indicator window 21 can be arranged in any suitable location, such as on a top wall or surface of the housing 1. This can allow the user to more easily see the indicator window 21 in some use configurations. Also, the indicator element 22 moves vertically in some embodiments, but can move in any suitable way, such as horizontally along an inner surface of the top wall or surface of the housing 1. As will be understood, the mounting arrangement of the lever arm 23 and pressure sensor element 24 can be adjusted to accommodate suitable positioning and movement of the indicator window 21 and element 22.

The pressure indicator can provide an indication of capacity or pressure in the gas cylinder 4 when the outlet valve 91 is closed, such as when the gas outlet 9 is uncoupled from a stopper 7 or other pressurized gas receiver. In some embodiments, the regulator 5 outputs pressurized gas to a pressure limit which causes the pressure in the conduit 25 to reach the pressure limit when the outlet valve 91 is closed. The pressure indicator can be configured to provide a suitable indication (e.g., "O" or a green color) when the pressure in the conduit 25 is over a threshold (such as 10-30 psi) to indicate that the gas cylinder 4 has capacity to provide pressurized gas to a beverage container or other destination device, and to provide another indication (e.g., "X" or a red color) when the pressure in the conduit 25 is below the threshold (e.g., 20 psi or less) to indicate that the gas cylinder 4 does not have suitable capacity to deliver pressurized gas. Similarly, the pressure indicator can provide an indication of a pressure in a beverage container or other destination device when the gas outlet 9 is coupled to the beverage container and the outlet valve 91 is open. In some embodiments, the pressure in the conduit 25 will be equal or approximately equal to the pressure in a beverage container that is fluidly coupled to the gas outlet 9 when the outlet valve 91 is open. Thus, the pressure indicator will provide an indication of whether the pressure in the beverage container is at one or more particular levels or otherwise above a threshold. This can allow a user to couple the gas outlet 9 to a stopper 7 that is engaged with a beverage container 8 and cause gas to be delivered, such as by pressing the outlet 9 into engagement with the gas inlet 71 of the stopper 7 so as to open the outlet valve 91. During gas delivery, the user can observe the indicator window 21 until a desired pressure level is established in the container 8, e.g., gas can be delivered until the pressure indicator 22 provides a "O" indication in the window 21. At this point, the user can stop gas delivery and uncouple the gas source 1 from the stopper 7. With the gas outlet valve 91 closed, gas pressure in the conduit 25 will achieve the pressure limit of the regulator 5 if the gas cylinder 4 has suitable capacity, or will be at a lower pressure than the pressure limit if the gas cylinder 4 has been suitably depleted. If the cylinder 4 has suitable capacity, the pressure indicator 22 will provide an "O" or other indication of relatively high pressure (e.g., above a threshold), and will provide an "X" or other indication of relatively low pressure (e.g., below the threshold) if the cylinder 4 does not have suitable capacity. As a result, when a user picks up the gas source 1 for use, the user can observe the pressure indication in the window 21 to determine if the gas cylinder 4 has suitable capacity for use. If not, the user can replace the gas cylinder 4 as necessary.

In some embodiments, the pressure indicator can provide the user with the ability to confirm that gas is being provided to a beverage container and that pressure in the container is increasing. For example, when the gas source 1 is at rest and not being used to deliver gas, the pressure indicator will provide an indication of the capacity of the gas cylinder 4 to provide pressurized gas. Once the gas source 1 is coupled to a stopper 7 to deliver gas to a beverage container 8, the pressure in the conduit 25 will initially drop below the pressure limit of the regulator 5. In some embodiments, a flow restrictor can be provided in the conduit 25 between the regulator 5 and the gas outlet 9 upstream of where the pressure sensor 24 is coupled to the conduit 25. This flow restrictor can help maintain a pressure in the conduit 25 downstream of the flow restrictor that is closer to that in the beverage container during gas flow over a threshold rate, thereby allowing the pressure indicator to provide a relatively accurate indication of pressure in the container 8 while gas is delivered to the container 8. As pressure in the container 8 rises, the pressure indicator will indicate an increasing pressure which the user can view to confirm that gas is being delivered and pressure is rising in the container 8. When the pressure in the container 8 reaches a desired level, the user can stop gas delivery, such as by decoupling the gas source 1 from the stopper 7, releasing a lever, button, etc. or taking other suitable action.

Figure 4:
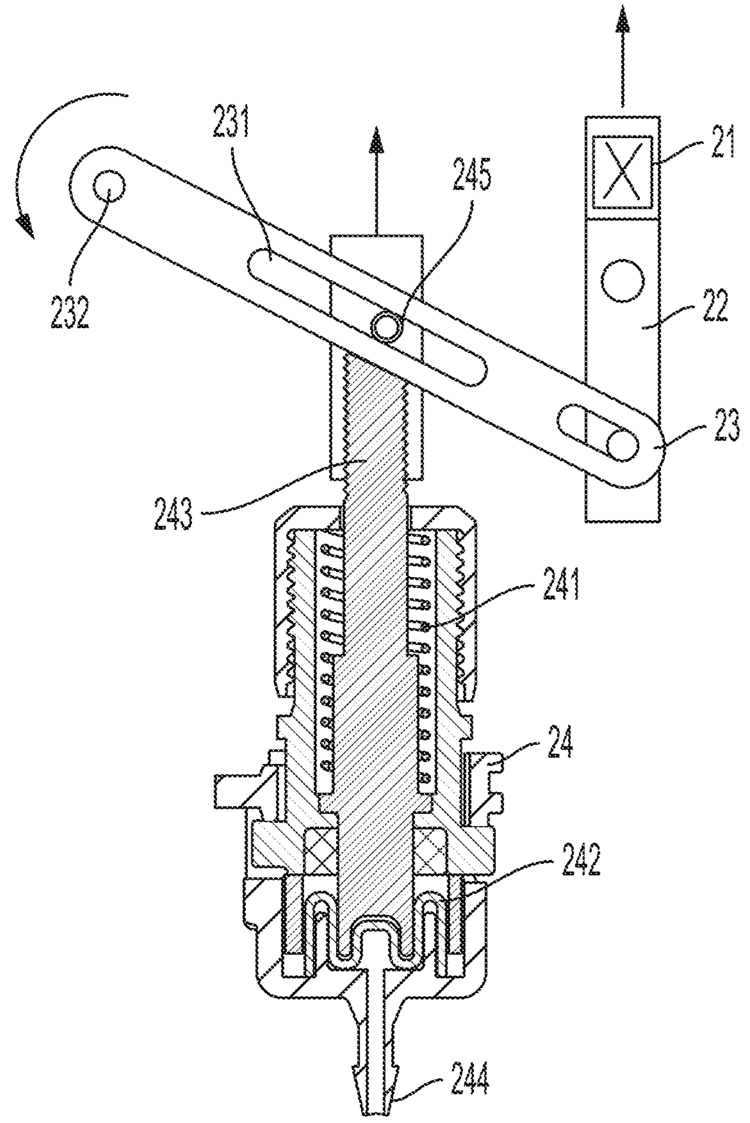
FIG. 4 shows a detailed view of the pressure indicator of the FIG. 1 embodiment.

FIG. 4 shows a closeup view of the pressure indicator in the FIG. 1 embodiment. In some embodiments, the pressure sensor 24 includes a resiliently biased piston 243 that is movable based on a pressure in the conduit 25, which is coupled to an inlet 244 of the sensor 24. Pressure at the inlet 244 causes a diaphragm 242 to move upwardly, which moves the piston 243 upwardly against the bias of a spring 241. The piston 243 is coupled to the lever arm 23 by a pin 245 that is engaged with a slot 231 of the lever arm 23. Upward movement of the piston 243 and the pin 245 causes the lever arm 23 to pivot counterclockwise about a pivot 232 at a proximal end of the lever arm 23 that is fixed relative to the housing 2. This causes a distal end of the lever arm 23 to move upwardly, which moves the indicator element 22 upwardly relative to the indicator window 21 which is fixed relative to the housing 2. Movement of the indicator element 22 relative to the window 21 corresponds to different pressures at the inlet 244 of the pressure sensor 24 and causes different portions of the indicator element 22 to be visible at the window 21. Thus, a portion of the indicator element (e.g., including an "X" or O" or other indicia) that is visible at the window 21 provides an indication of the pressure in the conduit 25. Relatively lower pressure at the inlet 244 of the pressure sensor 24 allows the piston 243 to move downwardly under the bias of the spring 241, which moves the indicator element 22 downwardly relative to the indicator window 21. As noted above, the indicator element 22 can be movable between positions in which a first portion of the indicator element (e.g., bearing an "X") is visible for pressures below a threshold and a second portion of the indicator element (e.g., bearing an "O") is visible for pressures above the threshold. Thus, the first and second portions of the indicator element 22 are visible through a window 21 of the housing 2 depending on a pressure in the conduit 25. As also described above, the indicator element 22 can include three or more indication portions that can be visible through the window 21, e.g., to provide different pressure level indications such as a first for low or no pressure, a second for a desired pressure level in a beverage container and a third for indicating a capacity of the gas cylinder to pressurize a beverage container.

In some embodiments, the gas source 1 can be configured to use a gas cylinder that is arranged to be engaged at a cap attached to the cylinder body for applying a piercing force to pierce the gas outlet and to maintain a seal between the gas cylinder and piercing element or other gas receiver of the gas source 1. This can enable the gas source 1 to use differently sized and shaped gas cylinders 4 because the size and shape of the cylinder body is not relevant to the piercing operation as is the case in most gas cylinder piercing arrangements. That is, many gas cylinder piercing configurations support a bottom of the cylinder, opposite the gas outlet, for piercing. As a result, variations in cylinder length, shape or other features can interfere with proper piercing. However, in arrangements where the gas cylinder cap can be engaged for applying a piercing and sealing force, the cylinder body size and/or shape is not relevant to engaging the gas cylinder.

Figure 5:
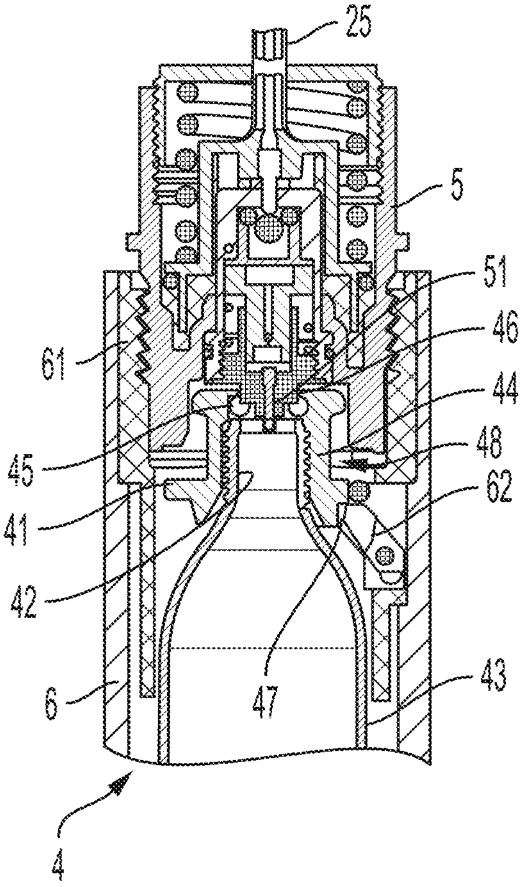
FIG. 5 shows a closeup view of a gas cylinder with a cap engaged with a piercing element and regulator.

FIG. 5 shows an illustrative embodiment in which a gas cylinder 4 is engaged at a cap for applying a piercing and sealing force to the cylinder 4. In some embodiments, the cylinder 4 includes a body 43, e.g., a steel or other metal container configured to hold high pressure gas and/or liquified gas for delivery to the gas source 1. The body 43 can have a neck 42 with a top surface having a piercable gas outlet that can be pierced by a piercing lance or other element 51 by moving the piercable gas outlet into contact with the piercing element 51. A cap 48 can be secured to the neck 42 and have a sidewall 44 extending around the top surface and a side portion of the neck 42. As examples, the cap 48 can be secured to the neck 42 by adhesive, a threaded engagement as shown, welding, and/or other. The sidewall 44 defines an inner space in which a gasket 45 is located and an upper opening 46 to the inner space. The gasket 45 can be configured to form a seal with the top surface of the neck and to form a seal with a piercing element 51 that extends through the upper opening 46 and into the inner space to pierce the gas outlet of the neck. For example, movement of the piercing element 51 into the inner space can deform the gasket 45 so the gasket forms a seal with both the piercing element 51 at an upper side and the gas outlet of the neck at a lower side. The cap 48 can include a flange 41 that extends radially outwardly from the sidewall 44 and has a lower surface positioned above a lower portion of the sidewall. That is, at least a portion of the sidewall 44 can extend below the lower side of the flange 41 such that the lower surface of the flange 41 and the lower portion of the sidewall 44 form a catch 47, e.g., for an engagement pawl 62 to engage with the cap 48. The cap 48 can be configured to support the gas cylinder 4 to pierce the gas outlet in response to the engagement pawl 62 engaging with the catch 47 and forcing the cap 48 and body 43 into engagement with the piercing element 51 received into the upper opening 46 of the cap 48. Since the gas cylinder is engaged only at the catch 47 of the cap 48 for applying a piercing and sealing force to the cylinder 4, the size and shape of the body 43 can vary without affecting the piercing and sealing operation. This can allow the gas source 1 to use a variety of differently sized and shaped cylinders 4.

Figure 6:
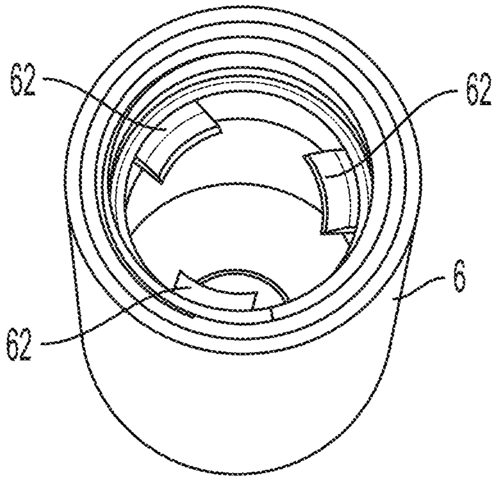
FIG. 6 shows a perspective view of the cylinder holder in the FIG. 1 embodiment.
Figure 7:
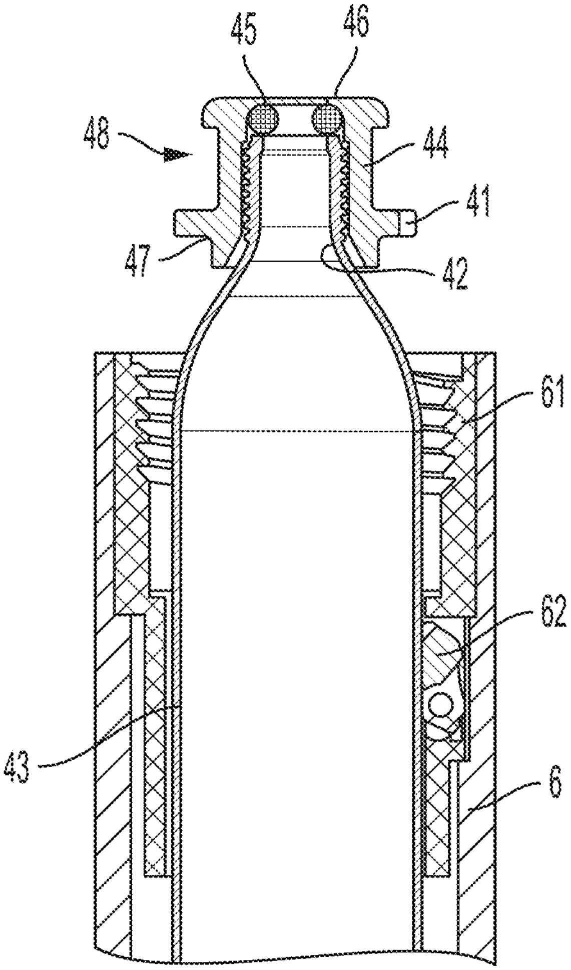
FIG. 7 shows a gas cylinder being received in the cylinder holder of FIG. 6.

In some embodiments, the engagement pawl(s) 62 used to engage with the catch 47 of the cap 48 on a cylinder 4 can be part of the cylinder holder 6. For example, as can be seen in FIGS. 5 and 6, the cylinder holder 6 can have a space in which to receive the body 43 of the gas cylinder 4, and one or more engagement pawls 62 can be configured at an opening to the space to engage with the catch 47 of the gas cylinder received in the space. FIG. 5 shows a pawl 62 engaged with the catch 47 of the cap 48 with the cylinder 4 fully received into the space of the cylinder holder 6, and FIG. 6 shows an embodiment with three engagement pawls 62 arranged at an opening to the space of the cylinder holder 6 into which a gas cylinder is received. The engagement pawls 62 can be pivotally mounted to move into and out of a pathway along which the gas cylinder 4 is received into the space of the cylinder holder 6. For example, FIGS. 5 and 6 illustrate that the body 43 of the gas cylinder 4 is larger than the region defined between the pawls 62 when the pawls are pivoted to an engagement position as in FIGS. 5 and 6. The gas cylinder body 43 (e.g., a lower end of the body 43) and the engagement pawls 62 can be configured such that movement of the gas cylinder body 43 into the space of the cylinder holder 6 pivots the engagement pawls 62 out of the pathway (e.g., upwardly and outwardly against a resilient bias that moves the distal ends of the pawls 62 inwardly) so the cylinder 4 can be received into the holder 6 as shown in FIG. 7. The resilient bias on the engagement pawls 62 can urge the distal ends of the pawls 62 to move into the pathway so that once the larger portion of the body 43 is positioned below the pawls as in FIG. 5, the pawls 62 move inwardly into the pathway to engage with the catch 47 of the cap 48. The pawls 62 can be pivotally mounted at a lower or proximal end to the cylinder holder 6 body and have a distal end that engages at the catch 47. The cylinder holder 6, cap 48 and body 43 can be configured such that the body 43 is suspended in the space of the cylinder holder 6 when the engagement pawls 62 are engaged with the catch 47 of the cap 48. By suspending the cylinder 4 in the cylinder holder 6, the body 43 of the cylinder 4 can be out of contact with the holder 6. This can permit the holder 6 to accommodate a wider range of cylinder body 43 sizes and shapes since the cylinders 4 can be supported at the cap 48 only. However, this is not required and the holder 6 can engage with the cylinder 4 at one or more parts of the body 43 in addition or alternately to engaging at the cap 48. Also, the use of engagement pawls 62 is not required for engagement of a cylinder 4 at a catch 47 of a cap. Any suitable support can be employed, such as a U-shaped component that is configured to receive and engage with the catch 47, one or more hooks or tabs to engage under the flange 41, etc.

With a gas cylinder 4 engaged at the cap 48 by one or more engagement pawls 62 or other cylinder support of the cylinder holder 6, the cylinder holder 6 can engage with the housing 2 or other gas receiving portion of the gas source 1 to pierce the gas outlet of the cylinder and/or form a seal between the cylinder and the gas receiver. In some embodiments, the cylinder holder includes a threaded portion configured to engage with the gas receiving portion of the housing 2 to move the gas outlet of the cylinder 4 into engagement with the piercing element 51 in response to rotation of the cylinder holder 6 relative to the housing 2. This configuration is shown in FIG. 5 in which the cylinder holder 6 includes a threaded portion 61 that engages with a complementary threaded portion on the regulator 5. As the threaded portion of the holder 6 is rotated relative to the regulator 5, the pawls 62 urge the cap 48 and gas outlet of the cylinder toward the piercing element 51, which is received into the upper opening 46 of the cap 48. This causes the gasket 45 to deform and form a seal with the piercing element 51 and the gas outlet of the cylinder 4 as well as the piercing element 51 to pierce the gas outlet to release pressurized gas to the regulator 5. Configuring the pawls 62 as shown in FIG. 5 so that the contact area between the distal end of the pawls 62 and the catch 47 is located radially inwardly of the pivot point for the proximal end of the pawls 62 and is located between the pivot point for the proximal end of the pawls 62 and where the piercing element 51 contacts the cap 48 and gas outlet of the cylinder 4 causes the pawls 62 to press inwardly as well as upwardly on the cap 48 as the engagement force between the cylinder 4 and piercing element 51 increases. This helps ensure that the pawls 62 remain securely engaged with the catch 47, e.g., because the portion of the cap sidewall 44 below the flange 41 keeps the distal end of the pawls 62 engaged at the catch 47.

Threaded engagement between the cylinder holder 6 and gas receiving portion of the gas source 1 is not required, and other configurations for engaging a cylinder 4 with the gas source 1 can be used. For example, relative movement of the gas cylinder toward a piercing element or gas receiving portion can be driven by a lever, motor drive, suitable linkage arrangement, hydraulic or other actuator, etc. For example, a two bar linkage may be employed where an end of a first link is pivoted to the housing 2 above the regulator 5, an end of a second link is pivoted to the regulator 5, and the other ends of the links are pivotally coupled together. A lever may be attached to the ends of the links that are coupled together so that movement of the lever causes a scissors action of the links that moves the regulator 5 into engagement with the gas cylinder (down in FIG. 5). A similar arrangement could be used to move the cylinder holder 6 rather than the regulator 5. Another arrangement may include a gear drive whereby rotation of a lever rotates a pinion gear, which causes a rack coupled to the regulator 5 or cylinder holder 6 to move up and down with lever movement. Other variations will occur to those of skill in the art, including motor drives that may be actuated by a user pressing a button, etc. Note also that in some embodiments, the regulator and piercing lance are not fixed together and the actuator may be arranged to move the lance and gas cylinder relative to each other, e.g., move the gas cylinder relative to the lance, which remains stationary relative to the housing. Thus, an actuator may have a piercing state in which the lance and cylinder are engaged, and a retracted state in which the lance and cylinder are not engaged.

FIG. 7 illustrates a few features of the gas cylinder 4 that can provide performance advantages, e.g., in terms of forming a suitable seal and proper piercing of the gas outlet. In some embodiments, the flange 41 and the cap 48 are made as single unitary piece. This can help ensure that the engagement of the pawls 62 or other cylinder support remains robust, e.g., because a joint between the cap 48 and flange 41 is less likely to fail. However, in some cases the flange 41 and cap 48 can be made separately and joined together or joined to the body 43. In some embodiments, the sidewall 44 of the cap is arranged to extend above the top surface of the neck 42, e.g., to define the inner space in which the gasket 45 is located. The gasket 45 can have an upper surface with a region of the upper surface being exposed at the upper opening 46 of the cap 48 and arranged to contact the piercing element 51 received in the upper opening of the cap to pierce the gas outlet of the cylinder. A lower surface of the gasket 45 can be configured to form the seal with the top surface of the neck. The cap can include an upper wall with an annular shape that extends radially inwardly from the sidewall 44 and includes a radially inner part that defines the upper opening 46. This upper wall can help contain the gasket 45, which may deform substantially during formation of a seal with the piercing element 51 and/or top surface of the neck. In some cases, the gasket 45 has an uppermost part of the upper surface located radially inward of the radially inner part of the upper wall. This arrangement can help the gasket 45 form a seal with the piercing element 51 before the gas outlet is pierced, which can reduce gas leakage. The catch can have a curved shape at a junction between the lower surface of the flange 41 and the lower portion of the sidewall 44, e.g., to form a fillet or concave curved shape that extends around the cap 48.

While aspects of the invention have been shown and described with reference to illustrative embodiments, it will be understood by those skilled in the art that various changes in form and details may be made therein without departing from the scope of the invention encompassed by the appended claims.

The invention claimed is:

1. A gas cylinder comprising:

a body having a storage volume and a neck having a top surface with a piercable gas outlet;

a cap secured to the neck and having a sidewall extending around the top surface and a portion of the neck, the sidewall defining an inner space and an upper opening to the inner space, the cap including an upper wall having an annular shape that extends radially inwardly from the sidewall and includes a radially inner part that defines the upper opening, and a flange that extends radially outwardly from the sidewall and has a lower surface positioned above a lower portion of the sidewall, the lower surface of the flange and the lower portion of the sidewall forming a catch for an engagement pawl; and a gasket located in the inner space and configured to form a seal with the top surface and to form a seal with a piercing element that extends into the inner space to pierce the gas outlet, wherein the cap is configured to support the gas cylinder to pierce the gas outlet in response to the engagement pawl engaging with the catch and forcing the cap and body into engagement with a piercing element received into the upper opening, and wherein the gasket has an uppermost part of an upper surface located radially inward of the radially inner part of the upper wall.

2. The gas cylinder of claim 1, wherein the flange and the cap are made as single unitary piece.

3. The gas cylinder of claim 1, wherein the sidewall of the cap is arranged to extend above the top surface of the neck, a region of the upper surface of the gasket being exposed at the upper opening of the cap and arranged to contact the piercing element received in the upper opening of the cap to pierce the gas outlet of the cylinder, and a lower surface arranged to form the seal with the top surface of the neck.

4. The gas cylinder of claim 1, wherein the uppermost part of the upper surface of the gasket extends into the upper opening.

5. The gas cylinder of claim 1, wherein the cap includes an internal thread arranged to engage with an external thread on the neck.

6. The gas cylinder of claim 1, wherein the catch has a curved shape at a junction between the lower surface of the flange and the lower portion of the sidewall.

7. The gas cylinder of claim 6, wherein the curved shape extends around the cap.

8. An assembly-comprising:

a gas cylinder including:

a body having a storage volume and a neck having a top surface with a piercable gas outlet;

a cap secured to the neck and having a sidewall extending around the top surface and a portion of the neck, the sidewall defining an inner space and an upper opening to the inner space, the cap including a flange that extends radially outwardly from the sidewall and has a lower surface positioned above a lower portion of the sidewall, the lower surface of the flange and the lower portion of the sidewall forming a catch for one or more engagement pawls; and a gasket located in the inner space and configured to form a seal with the top surface and to form a seal with a piercing element that extends into the inner space to pierce the gas outlet, and a cylinder holder having a space in which to receive the body of the gas cylinder, and one or more engagement pawls configured at an opening to the space to engage with the catch of the gas cylinder received in the space, wherein the cap is configured to support the gas cylinder to pierce the gas outlet in response to the one or more engagement pawls engaging with the catch and forcing the cap and body into engagement with a piercing element received into the upper opening.

9. The assembly of claim 8, wherein the cylinder holder is configured to engage with a gas supply having a piercing element such that the one or more engagement pawls force the cap, gasket and gas outlet into engagement with the piercing element to pierce the gas outlet.

10. The assembly of claim 9, wherein the cylinder holder includes a threaded portion configured to engage with the gas supply to move the gas outlet into engagement with the piercing element in response to rotation of the cylinder holder relative to the gas supply.

11. The assembly of claim 8, wherein the one or more engagement pawls are pivotally mounted to move into and out of a pathway along which the gas cylinder is received into the space.

12. The assembly of claim 11, wherein the gas cylinder body and the one or more engagement pawls are configured such that movement of the gas cylinder body into the space pivots the one or more engagement pawls out of the pathway.

13. The assembly of claim 11, wherein the one or more engagement pawls are resiliently biased to move into the pathway.

14. The assembly of claim 8, wherein the cylinder holder, cap and body are configured such that the body is suspended in the space of the cylinder holder when the one or more engagement pawls are engaged with the catch of the cap.

15. The assembly of claim 8, wherein the one or more engagement pawls each have an engagement end that engages with the catch opposite a mounted end at which the engagement pawl is mounted to the cylinder holder, the engagement end being positioned nearer the opening to the space than the mounted end.

* * * * *